United States Patent [19]

Kluczynski

[11] Patent Number: 4,572,014
[45] Date of Patent: Feb. 25, 1986

[54] ELONGATED SCREW SUPPORTING CONSTRUCTION

[75] Inventor: Paul F. Kluczynski, North Tonawanda, N.Y.

[73] Assignee: St. Mary Manufacturing Corp., North Tonawanda, N.Y.

[21] Appl. No.: 270,406

[22] Filed: Jun. 4, 1981

[51] Int. Cl.[4] .................. F16H 27/02; F16H 1/18; F16H 1/20; F16H 29/02
[52] U.S. Cl. ................. 74/89.15; 74/424.8 R; 74/424.8 A
[58] Field of Search .............. 74/424.8 A, 424.8 R, 74/89.15; 308/3.9

[56] References Cited

U.S. PATENT DOCUMENTS

| 508,981 | 11/1893 | Roger | 30/309 |
|---|---|---|---|
| 2,333,487 | 11/1943 | Nast | 308/3.9 |
| 2,365,681 | 12/1944 | Gartin | 308/3.9 |
| 2,365,683 | 12/1944 | Curtis et al. | 308/3.9 |
| 3,670,583 | 6/1972 | Leming | 74/89.15 |
| 3,733,914 | 5/1973 | Sheesley | 74/89.15 |
| 3,756,669 | 9/1973 | Bucelluni | 308/3.9 |
| 4,023,431 | 5/1977 | Paulas | 74/424.8 A |
| 4,076,337 | 2/1978 | Childress | 308/3.9 |

FOREIGN PATENT DOCUMENTS

| 604954 | 10/1934 | Fed. Rep. of Germany | 74/424.8 A |
| 421433 | 12/1934 | United Kingdom | 74/424.8 A |
| 636370 | 12/1978 | U.S.S.R. | 384/24 |

Primary Examiner—Lawrence J. Staab
Assistant Examiner—Michael David Bednarek
Attorney, Agent, or Firm—Joseph P. Gastel

[57] ABSTRACT

A support for stabilizing an elongated carriage-driving screw against whipping while permitting the carriage to pass the area at which the screw is supported including an elongated screw for driving a carriage, a base, spaced bearings selectively movable radially into engagement with opposite sides of the screw, and a moving linkage including a fluid piston and cylinder for selectively moving said bearings into and out of engagement with the screw, said bearings being either planar or concave, and in the latter instance, either fixedly or floatingly mounted.

15 Claims, 12 Drawing Figures

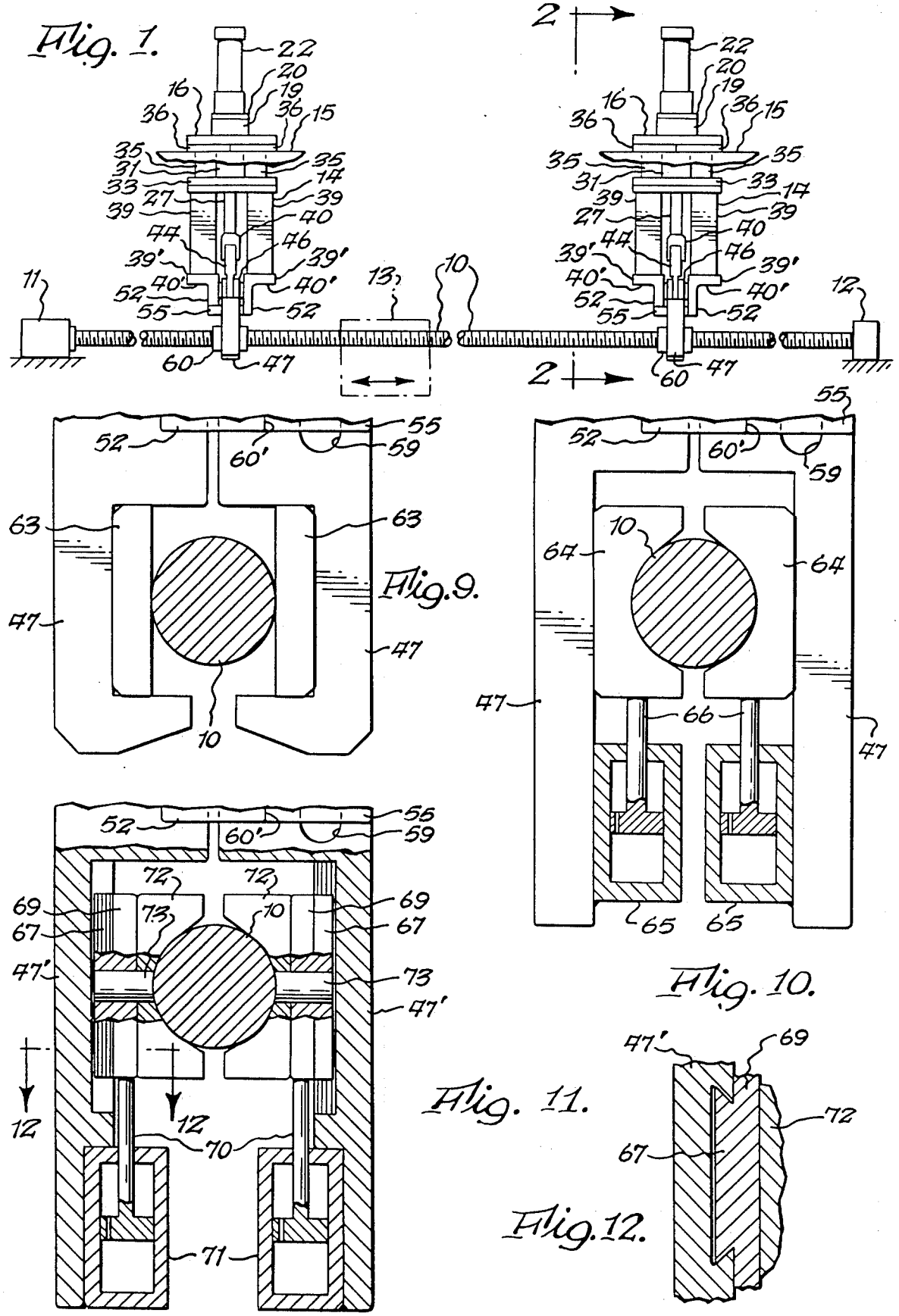

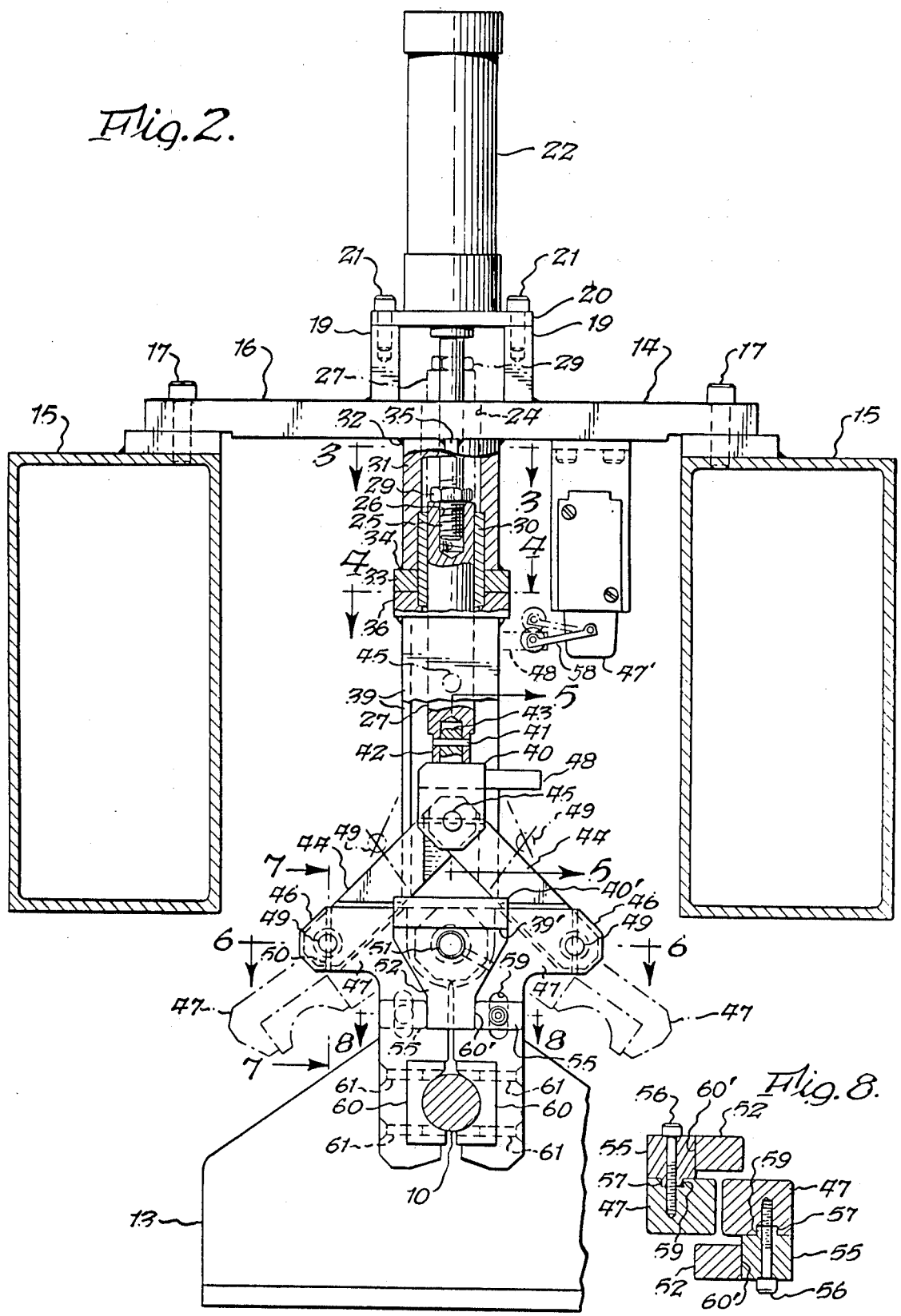

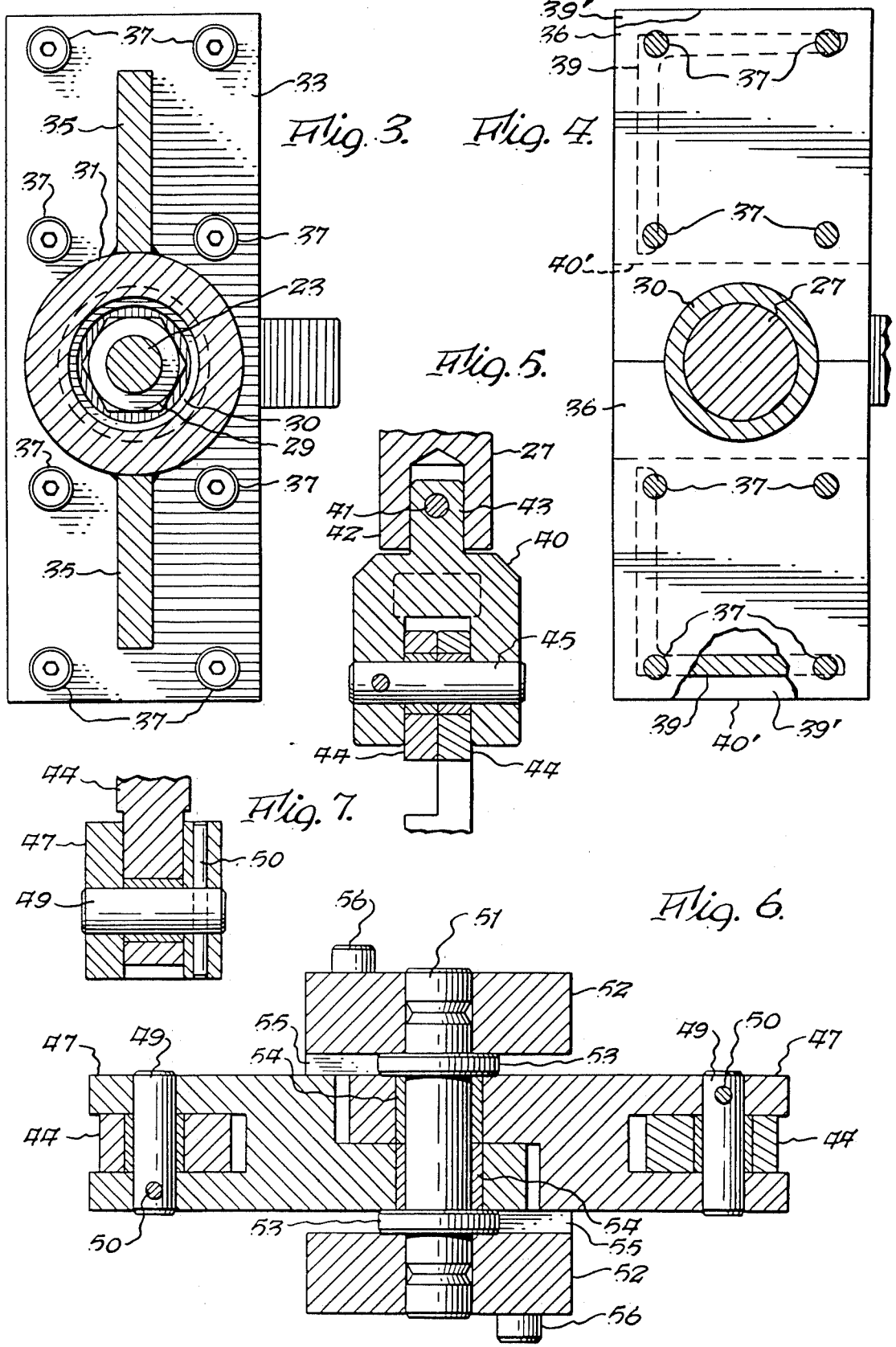

ELONGATED SCREW SUPPORTING CONSTRUCTION

BACKGROUND OF THE INVENTION

The present invention relates to a support construction for stabilizing an elongated carriage-driving screw against whipping while permitting the carriage to pass the area at which the screw is supported.

By way of background, there are machines in which a carriage has to move considerable lengths along a bed, such as in the bending machines shown in U.S. Pat. Nos. 3,798,956 and 3,885,410. In the past the carriage was driven by arrangements other than a feed screw. This was because an elongated feed screw was subject to a whipping action which could cause wear on the bearings connected to the carriage and also set up objectionable vibrations. However, a screw for driving a carriage has the advantage that the position of the carriage can be very closely controlled.

SUMMARY OF THE INVENTION

It is accordingly one object of the present invention to provide a support construction for stabilizing an elongated carriage driving screw against whipping, while permitting the carriage to pass the area at which the screw is supported.

Another object of the present invention is to provide a stabilizing support for a carriage-driving screw wherein bearings which actually confine the movement of the screw are mounted for floating movement so as to minimize the wear on the bearings. Object objects and attendant advantages of the present invention will readily be perceived hereafter.

The present invention relates to a support for stabilizing an elongated carriage-driving screw against whipping while permitting said carriage to pass the area at which said screw is supported comprising an elongated screw for driving a carriage, a base, separate spaced stabilizing means on said base for preventing whipping of said screw, and moving means for selectively moving said stabilizing means into and out of engagement with opposite sides of said screw to permit said carriage to pass the area at which said stabilizing means supports said screw. In its more specific aspects the stabilizing means can comprise bearings of various configurations including planar bearings, and concave bearings, with the latter being fixedly mounted on the jaws or floatingly mounted thereon.

The various aspects of the present invention will be more fully understood when the following portions of the specification are read in conjunction with the accompanying drawings wherein:

BRIEF DESCRIPTION OF THE DRAWINGS

FIG. 1 is a fragmentary view, partially in cross-section, of an elongated screw being supported at spaced points along portions of its length;

FIG. 2 is a fragmentary view, partially in cross section, of the support and moving mechanism for supporting the jaws and selectively moving them into and out of engagement with a screw;

FIG. 3 is a cross sectional view taken substantially along line 3—3 of FIG. 2 and showing the construction for supporting the piston of a fluid operated cylinder;

FIG. 4 is a fragmentary cross sectional view taken substantially along line 4—4 of FIG. 2 and showing details of the mounting structure for the movable jaws;

FIG. 5 is a fragmentary cross sectional view taken substantially along line 5—5 of FIG. 2 and showing further details of construction for mounting the movable jaws;

FIG. 6 is a cross sectional view taken substantially along line 6—6 of FIG. 2 and showing the construction for mounting the movable jaws relative to a fixed extension of the cylinder and relative to the links connected to the piston;

FIG. 7 is a fragmentary cross sectional view taken substantially along line 7—7 of FIG. 2 and showing the pivotal connection between a movable jaw and the link which moves it;

FIG. 8 is a cross sectional view taken substantially along line 8—8 of FIG. 2 and showing the construction for mounting blocks on the movable jaw for limiting the position to which they can be moved when they are in supporting relationship to the screw;

FIG. 9 is a fragmentary end elevational view showing a modified form of screw supporting construction mounted on the jaws;

FIG. 10 is a fragmentary end elevational view showing an alternate construction for floatingly mounting screw supporting bearings on the jaws;

FIG. 11 is a fragmentary end elevational view, partially in cross section, showing a further embodiment similar to FIG. 10 and in which the jaws are also mounted for pivotal movement; and FIG. 12 is a fragmentary cross sectional view showing a dovetail connection between the screw supporting member and the jaw.

DESCRIPTION OF THE PREFERRED EMBODIMENTS

As noted above, the present invention relates to an improved screw supporting mechanism which will support an elongated screw which drives a carriage. The supporting mechanism stabilizes the screw against whipping when it rotates at high speed, and the supporting mechanism is movable out of engagement with the screw to permit the carriage to pass. By way of example, screw 10 of FIG. 1 is approximately 15 feet long and about 1 inch in diameter. It is connected to a motor 11 at one end which drives it and its opposite end is mounted in bearing 12. A carriage 13 has a portion in threaded engagement with the screw and is thus movable axially of the screw as it rotates. Screw supporting and stabilizing members 14 are mounted at spaced intervals axially of screw 10, and in this instance are located about 5 feet from each other, and each member is located 5 feet from its respective end of the screw. The members 14 prevent screw 10 from whipping when it is driven at a high speed to move carriage 13.

Each support member 14 is mounted on a pair of spaced box beams 15 suitably mounted on the frame (not shown) of a machine, and these beams in essence constitute the base for the screw stabilizing structure. A plate or beam 16 is suitably fastened at its opposite ends to box beams 15 by means of screws 17. A pair of posts 19 have their lower ends affixed, as by welding, to beam 16 and a plate 20 is attached to post 19 by means of screws 21. A fluid cylinder 22 is suitably secured to the top of plate 20, and piston 23 associated with cylinder 22 extends through an opening in plate 20 and downwardly through an opening 24 in plate 16. The lower end of piston 23 is threaded at 25 and is received in tapped bore 26 of piston extension 27. A lock nut 29 secures the connection. A bearing 30, which is mounted in cylindrical tube 31, guides piston extension 27 for axial movement within tube 31, which has its upper end welded to the underside of plate 16 at 32 and has its lower end welded to rectangular plate 33 at 34. A pair of rectangular plates 35 (FIG. 3) are welded to opposite sides of tube 31 and extend between upper plate 16 and lower plate 33 to stabilize the latter. A pair of plates 36 (FIG. 4) are attached to the underside of plate 33 by means of screws 37. Welded to the undersides of plates 34 are the upper ends of angles 39, the lower ends of which are welded to horizontal legs 39' of angles 40'.

Piston extension 27 extends downwardly between angles 39. At the lower end of piston extension 27, a linkage mounting head 40 is attached by means of pin 41, the pin extending through portion 42 (FIG. 5) at the lower end of piston extension 27 and through extension 43 of member 40. The upper ends of links 44 are pivotally mounted on member 40 by means of pin 45 and the lower ends of links 44 are pivotally secured to the upper ends 46 of jaws 47 by pins 49, the latter being fixed in position by cross pins 50. Jaws 47 are essentially right-left counterparts of each other, as can be visualized from FIG. 6. The inner ends of jaws 47 are pivotally mounted on pin 51 which is mounted between spaced depending leg portions 52 of angles 40'. Suitable spacers 53 and bearing 54 complete the construction. A block 55 is secured to each jaw 47 by means of a screw 56, each block 55 including a rectangular portion 57 which fits into a slot 59. Each block 55 abuts the side 60' of a leg 52 when the jaws are in the closed solid-line position shown in FIG. 2, to thereby limit the closed position to which the jaws can be moved.

When the carriage 13 moves axially of screw 10, it will periodically have to pass the areas at which screw 10 is supported by jaws 47. Accordingly, suitable triggering mechanism (not shown) is provided to cause jaws 47 to move from the solid-line position shown in FIG. 2 to the dotted-line position shown therein. This is effected by actuating fluid pressure cylinder 22 to cause piston 23 to move upwardly into the cylinder so that, for example, lock nut 29 moves from its solid-line position to its dotted-line position, and all other members move a corresponding distance, for example, pivot pin 45 moves from its solid-line position to its dotted-line position. This will cause pivot pins 49 at the ends of links 44 to move from their solid-line positions to their dotted-line positions which in turn will cause jaws 47 to pivot about pin 51 from their solid-line positions to their dotted-line positions. This will provide a sufficient opening between jaws 47 to permit carriage 13 to pass by. After carriage 13 has passed by, suitable triggering mechanism (not shown) will again actuate cylinder 22 to cause jaws 47 to return to the solid-line position of FIG. 2. The limit of upward movement of piston extension 27 is governed by limit switch 47' which is engaged by dog 48 which engages follower 58 to terminate actuation of cylinder 22.

There are a number of different actual supporting bearing types which can be used to support screw 10. One type is shown in FIG. 2 wherein a pair of concave bearing members 60 are secured within jaws 47 by means of screws 61. The purpose of bearing members 60 is to prevent whipping of screw 10 when it is driven at high speed. As noted above, blocks 55 will determine the degree of engagement between bearing members 60 and screw 10, it being preferable that a small clearance be provided therebetween.

Another embodiment of a bearing arrangement for supporting screw 10 is shown in FIG. 9. In this embodiment two planar bearing members 63 are mounted within jaws 47 to provide tangential engagement on opposite sides of screw 10. By use of such an arrangement, whipping of screw 10 from side to side is prevented, and this will also limit movement of screw 10 in a vertical direction. The advantage of the embodiment of FIG. 9 over that of FIG. 2 is that there will be less wear on bearing members 63 than on bearing members 60, considering that screw 10 can act in the nature of a drill because of the helical thread thereon.

In FIG. 10 a still further embodiment of the bearing members is disclosed. In this embodiment concave bearing members 64 are mounted on jaws 47 by means of dashpot arrangements 65 having pistons 66 which support the bearing members 64. By use of this arrangement, bearing members 64 can float in a vertical direction to adjust to the position of screw 10, but they will not permit screw 10 to move from side to side because the jaws 47 will resist lateral movement, and thus the whipping of screw 10 will be dampened.

In FIGS. 11 and 12 a still further embodiment of the bearing construction of screw 10 is shown. In this construction jaws 47' are analogous to the above-described jaws 47 but they vary in structure in that there is a dovetail connection 67 between each jaw member 47' and a vertically movable plate 69 which is secured to the upper end of piston 70 forming a part of dashpot 71. Thus, plates 69 can float in a vertical direction, as guided by the dovetail connections. The concave bearing members 72 are secured to pins 73 which are pivotally mounted in plates 69. Thus, each bearing member 72 can pivot about the axis of pin 73. Therefore, the bearings 72 will essentially possess a univeral type of motion because they can move in a vertical direction because of the dashpot-dovetail connection described above, and further they can pivot because of the pin connection 73. By use of this arrangement, the bearings 72 can accommodate their position to the position of screw 10 while still stabilizing said screw by limiting the whipping motion thereof. In addition, because bearing members 72 can accommodate themselves to the position of screw 10, there will be very little wear of their bearing surfaces.

While the support arrangement has been shown in relation to a screw, it will be appreciated that it can be used in conjunction with any elongated rotating shaft which has a tendency to whip. It will be appreciated that while the separate spaced bearings have been shown as moving radially relative to the screw, other mechanical arrangements can be employed to cause them to move in a tangential direction.

While preferred embodiments of the present invention have been disclosed, it will be understood that the present invention is not limited thereto, but may be otherwise embodied within the scope of the following claims.

What is claimed is:

1. In a machine having an elongated screw supported only at opposite end portions thereof and a carriage driven by said elongated screw, a support for stabilizing said elongated screw against whipping while permitting said carriage to pass the area at which said screw is supported comprising a base, spaced stabilizing means on said base for preventing whipping of said screw, said spaced stabilizing means being oriented radially of said screw, and moving means for selectively moving said spaced stabilizing means radially into and out of engagement with opposite sides of said screw to permit said carriage to pass the area at which said stabilizing means supports said screw.

2. In a machine as set forth in claim 1 wherein said moving means comprises only a single fluid cylinder, and linkage means coupling said stabilizing means to said fluid cylinder.

3. In a machine as set forth in claim 2 wherein said linkage means comprises a piston in said cylinder, an elongated extension mounted on said cylinder, and wherein said stabilizing means comprises a pair of jaw-like members for engaging opposite sides of said screw, first mounting means pivotally mounting said jaw-like members on said elongated extension, a pair of rigid links having first and second ends, second mounting means for pivotally mounting said first ends on said piston, and third mounting means for pivotally mounting said second ends on said jaw-like members, whereby the movement of said piston causes said jaw-like members to move toward and away from engagement with said elongated screw.

4. In a machine as set forth in claim 3 including bearing means, and fourth mounting means mounting said bearing means on said jaw-like members for engaging opposite sides of said screw.

5. A support as set forth in claim 4 wherein said bearings means comprises substantially planar bearings.

6. A support as set forth in claim 4 wherein said bearing means comprise concave bearings.

7. In a machine as set forth in claim 6 wherein said third mounting means includes a floating connection between said concave bearings and said jaw-like members to permit said concave bearings to move in a predetermined direction with said screw.

8. In a machine as set forth in claim 7 including means for mounting said concave bearings on said jaw-like members for preventing movement of said screw in a direction substantially normal to said predetermined direction.

9. A support as set forth in claim 7 including means for mounting said concave bearings for pivotal movement, whereby the combination of floating movement and pivotal movement provides substantially universal adjustability of said concave bearings to the position of said screw.

10. A support as set forth in claim 9 including means for mounting said concave bearings on said jaw-like members for preventing movement of said screw in a direction substantially normal to said predetermined direction, whereby said universal adjustability is obtained in a substantially single plane.

11. In a machine as set forth in claim 3 wherein said cylinder is oriented in a vertical direction, and wherein said elongated extension comprises a first pair of spaced angles having first and second angle ends and having legs oriented in a vertical direction, said first angle ends being affixed proximate said cylinder and said second angle ends being remote from said cylinder, a second pair of spaced angles each having a horizontal leg affixed to said one of second angle ends of said first pair of spaced angles, each of said second pair of spaced angles having a vertical leg connected to said horizontal leg, and wherein said first mounting means for pivotally mounting said jaw-like members on said elongated extension comprises a first pin mounted on said vertical legs of said second spaced angles, and wherein said second mounting means comprises a second pin mounted between said first ends of said rigid links and said piston, and wherein said third mounting means comprises third pins mounted between said second ends of said rigid links and said jaw-like members.

12. In a machine as set forth in claim 11 including stop means located between said jaw-like members and said elongated extension for limiting the amount said jaw-like members can move toward each other.

13. In a machine as set forth in claim 12 wherein said stop means comprise blocks affixed to said jaw-like members.

14. In a machine as set forth in claim 3 including stop means located between said jaw-like members and said elongated extension for limiting the amount said jaw-like members can move toward each other.

15. In a machine having an elongated screw supported only at opposite end portions thereof and a carriage driven by said elongated screw and a pair of spaced beams located above said elongated screw and carriage, a support construction for stabilizing said elongated screw against whipping while permitting said carriage to pass the area at which said screw is supported comprising a beam member mounted across said spaced beams, an aperture in said beam member, a cylinder mounted on said beam member above said aperture, a piston in said cylinder, said piston having a piston portion extending through said aperture, a cylindrical tube aligned with said aperture and having an upper end and a lower end, means securing said upper end of said cylindrical tube to said beam member and said cylindrical tube extending downwardly therefrom, a bearing in said cylindrical tube, a piston extension mounted on said piston portion and slidably received in said bearing, plate means affixed to said lower end of said cylindrical tube and extending transversely thereto, aperture means in said plate means for permitting said piston extension to pass therethrough, a first pair of vertically oriented angles having upper and lower angle ends, means securing said upper angle ends to said plate means, a second pair of angles having horizontal legs and vertical legs, each of said horizontal legs being secured to a lower end of each of said first pair of angles, a pair of jaw-like members, said jaw-like members being located on opposite sides of said elongated screw, first pin means for pivotally mounting said jaw-like members on said vertical legs of said second angles, a pair of rigid links having first and second link ends, second pin means pivotally mounting said first link ends on said jaw-like members, and third pin means for pivotally mounting said second link ends on said piston extension, whereby the axial movement of said piston extension causes said jaw-like members to move radially into and out of engagement with said elongated screw.

* * * * *

UNITED STATES PATENT AND TRADEMARK OFFICE
CERTIFICATE OF CORRECTION

PATENT NO. : 4,572,014
DATED : February 25, 1986
INVENTOR(S) : Paul F. Kluczynski It is certified that error appears in the above-identified patent and that said Letters Patent are hereby corrected as shown below:

Column 5, line 29 (claim 5), change "A support" to --In a machine--.

line 30 (claim 5), after "bearings" change the comma to a period.

line 31 (claim 6), change "A support" to --In a machine--.

line 43 (claim 9), change "A support" to --In a machine--.

line 49 (claim 10), change "A support" to --In a machine--.

Signed and Sealed this

Twenty-seventh Day of May 1986

[SEAL]

Attest:

DONALD J. QUIGG

Attesting Officer

Commissioner of Patents and Trademarks